United States Patent
Oka et al.

(10) Patent No.: US 7,265,160 B2
(45) Date of Patent: Sep. 4, 2007

(54) CROSSLINKED BIODEGRADABLE RESIN CONTINUOUS FOAMED SHEET AND METHOD FOR PRODUCTION THEREOF

(75) Inventors: Yoshiyuki Oka, Otsu (JP); Jun Goto, Kyoto (JP); Fusayoshi Akimaru, Otsu (JP); Noriaki Tsukada, Otsu (JP); Junichi Tainaka, Kanzaki-gun (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 10/496,670

(22) PCT Filed: Nov. 27, 2002

(86) PCT No.: PCT/JP02/12364

§ 371 (c)(1),
(2), (4) Date: May 25, 2004

(87) PCT Pub. No.: WO03/046060

PCT Pub. Date: Jun. 5, 2003

(65) Prior Publication Data

US 2005/0032923 A1    Feb. 10, 2005

(30) Foreign Application Priority Data

Nov. 29, 2001 (JP) ............ 2001-364399
Jan. 16, 2002 (JP) ............ 2002-007111

(51) Int. Cl.
*C08J 3/28* (2006.01)
*C08J 9/06* (2006.01)

(52) U.S. Cl. ............ 521/50.5; 521/79; 521/97; 521/141; 521/149

(58) Field of Classification Search ............ 521/50.5, 521/79, 97, 141, 149
See application file for complete search history.

(56) References Cited

U.S. PATENT DOCUMENTS

| | | | |
|---|---|---|---|
| 4,035,443 A * | 7/1977 | Ide et al. | 525/73 |
| 4,107,259 A * | 8/1978 | Liu et al. | 264/331.13 |
| 5,093,426 A * | 3/1992 | Sakabe et al. | 525/223 |
| 5,314,927 A | 5/1994 | Kondo et al. | |
| 5,437,924 A * | 8/1995 | Decker, III et al. | 428/318.4 |
| 5,539,052 A * | 7/1996 | Shieh et al. | 525/92 R |
| 5,767,168 A * | 6/1998 | Dyer et al. | 521/149 |

FOREIGN PATENT DOCUMENTS

| | | |
|---|---|---|
| EP | 0391 158 | * 10/1990 |
| EP | 0 569 143 A2 | 4/1993 |
| EP | 0905175 A1 | 3/1999 |
| EP | 0 984 039 A1 | 3/2000 |
| EP | 0984039 A1 | 3/2000 |
| EP | 02 78 3639 | 12/2004 |
| JP | 58-84736 | 5/1983 |
| JP | 2-107648 | 4/1990 |
| JP | 6-248104 | 9/1994 |
| JP | 11-279311 | 10/1999 |
| JP | 2001-104729 | 4/2001 |

* cited by examiner

*Primary Examiner*—Irina S Zemel

(57) ABSTRACT

The foam sheet of the present invention is biodegradable, can be recycled, has good processability, is lightweight, exhibits excellent appearance, has practically satisfactory heat resistance and is more acceptable to the environment.

There is provided a crosslinked biodegradable resin continuous foam sheet comprising biodegradable resin, and has an expansion rate of about 1.5 to about 50 and a gel fraction of about 3% or more.

There is further provided a method for producing the foam sheet comprising the steps of: (1) preparing a sheet from a resin composition comprising a biodegradable resin, a thermal decomposable blowing agent, and a crosslinking promoter; (2) irradiating the resulting sheet with an ionizing radiation to crosslink the resin composition; and (3) subjecting the crosslinked sheet to heat treatment to continuously prepare a crosslinked foam sheet.

Thus, the foam sheet of the present invention can be used in a wide range of practical applications such as, for example, interior materials for an automobile, thermal insulators such as a pipe covering, cushioning materials such as a tape core and the like.

15 Claims, No Drawings

CROSSLINKED BIODEGRADABLE RESIN CONTINUOUS FOAMED SHEET AND METHOD FOR PRODUCTION THEREOF

FIELD OF THE INVENTION

The present invention generally relates to foam sheets, and more particularly to a continuous foam sheet comprising crosslinked biodegradable resin, wherein the sheet has an excellent appearance, processability, and biodegradability in addition to being recyclable so as to be environmentally more acceptable. Moreover, the present invention further relates and extends to a method for production thereof

BACKGROUND OF THE INVENTION

Resin foams such as polyolefin resin foams, polyurethane resin foams and the like have been used in a wide variety of industrial fields. This is because they possess various desirable features which include, but are not limited to, lightweight, thermal insulation, processability and shock absorption. Although the resin foams are typically lightweight, they are very difficult to recycle due to their bulky size. This is especially true for crosslinked resin foams. Furthermore, since the resin foams persist semi-permanently even after being buried in the ground, sites for incineration or landfill disposals of the wasted foams are being rapidly depleted, often resulting in serious environment pollution and landscape waste.

In order to address and alleviate such situation, biodegradable resins which are capable of being decomposed in the nature by microorganisms have been investigated and developed. Typically, they are commercially available as films or fibers. Furthermore, extruded foams of biodegradable resins have also been developed. One example which is currently known is non-crosslinked foams comprising aliphatic polyester resin. However, it was extremely unfeasible, if not virtually impossible, to form high molecular weight aliphatic polyester resins due to undesirable side reactions, such as hydrolysis which is of ten times caused by water generated during polycondensation. As a result, the melt viscosity during extrusion foaming is not sufficient to maintain optimal or even adequate cell structure. As such, foams having good cell structure and surface appearance cannot be obtained.

As an approach to resolve this problem, Japanese Patent No. 2655796 suggests a method of crosslinking resin using an ionized radiation. However, the method has drawbacks and deficiencies in that radiation cannot reach the inner portion of the subject to be radiated as it is over 1 mm thick and the cells in the inner portion of the subject upon foaming are coarse and uneven. Also, crosslinking by radiation should be carried out under $N_2$ atmosphere in order to prevent deterioration of resin. Thus, it is very difficult to prepare foams having various thickness and sufficient mechanical properties through the implementation of this method.

In addition, Japanese Laid Open Patent Publication No. (Hei)11-279311 discloses foams comprising lactone resin. Since degradation of lactone resin also takes place simultaneously with crosslinking when it is subjected to treatment by radiation, the melt viscosity during foaming is not sufficient to maintain adequate cell structure. Thus, it is extremely difficult to obtain foams with good surface appearance. In other words, irradiation at around room temperature typically requires the exposure of as high as 200 kGy. To address this problem, it is described that after melting the lactone resin at least to its melting point, irradiation is preferably carried out in its melt phase before crystallization. Thus, at low exposure, foams having high crosslinking degree (gel fraction) cannot be readily prepared.

Japanese Laid Open Patent Publication No. (Hei) 10-254511 discloses a method for preparing the foams generally comprising the steps of: (1) filling a mold with a resin composition consisting of starch, polyethylene resin, a thermal decomposable blowing agent and an organic peroxide; (2) decomposing the blowing agent and organic peroxide by exposure to pressure and heating; and (3) removing the pressure. However, since the decomposition temperature of an organic peroxide is similar to that of a blowing agent, the cell size of the obtained foams is uneven. Also, foams which have excellent appearance and which are in a continuous sheet form cannot be prepared by this method.

Japanese Patent No. 3229978 discloses a method for preparing aliphatic polyester resin foam particles having a gel fraction of at least 5%. Such method is typically performed by using an organic peroxide and a compound having at least two unsaturated bonds (i.e., a crosslinking promoter). In order to crosslink the base resin particles, the method essentially resorts to the steps of: (1) dispersing the particles into a dispersing medium such as water, ethylene glycol and methanol; (2) heating the dispersion after adding an organic peroxide and, if necessary, a crosslinking promoter. Thus, the foam particles prepared by this method may be hydrolyzed which may result in undesirable and nonoptimal foam particles. Furthermore, when these particles are subjected to a secondary process of forming them into a desired shape, a problem typically arises in that such particles may break out at their laminated sides. Thus, formation of a complicated and/or sophisticated shape is rarely possible when utilizing this method. Consequently, this method is incapable of making crosslinked foams in a continuous sheet form.

Japanese Laid Open Patent Publication No. (Sho) 46-38716 discloses a method for continuously producing polypropylene foams comprising random propylene/ethylene copolymer. This reference also discloses that the use of a crosslinking promoter enables a crosslinking reaction to be efficiently and smoothly performed.

Also, Japanese Laid Open Patent Publication No. (Sho) 60-28852 discloses a method of adding a crosslinking promoter to a mixture of random propylene/ethylene copolymer and polyethylene, and further crosslinking and foaming the product. However, this method has certain drawbacks and deficiencies. More specifically, because the polypropylene foams obtained by this method are crosslinked, they cannot be recycled and also they are not biodegradable. Thus, it is extremely difficult to dispose such foams. In addition, combustion calories for incinerating the foams are so high that they have negative influences and impacts on the global environment.

In summary, there is currently no method available for producing a continuous foam sheet which has a sufficient crosslinking degree and which is formed from a biodegradable resin. In view of such shortcoming, the present invention has been formulated after an extensive research to produce a crosslinked biodegradable resin continuous foam sheet, wherein the sheet has all the desired processability, mechanical properties, thermal properties and recyclability. More particularly, the present invention is found on a premise/that the crosslinked biodegradable resin continuous foam sheet can be prepared by using a biodegradable resin and a crosslinking promoter, hence achieving the primary objective of the present invention.

BRIEF SUMMARY OF THE INVENTION

To attain the objectives, which are described above, the present invention comprises the following constitution:

1. A crosslinked biodegradable resin continuous foam sheet comprising a biodegradable resin and having an expansion rate of about 1.5 to about 50 and a gel fraction of at least about 3%.

2. A method for producing the continuous foam sheet as defined in the above paragraph, generally comprising the following steps: (1) preparing a sheet from a resin composition comprising a biodegradable resin, a thermal decomposable blow agent and a crosslinking promoter; (2) irradiating the sheet with an ionizing radiation to crosslink the resin composition; and (3) subjecting the crosslinked sheet to heat treatment to continuously prepare a crosslinked foam sheet.

DETAILED DESCRIPTION OF THE INVENTION

The present invention is directed to a crosslinked biodegradable resin continuous foam sheet and a method for production thereof. The details of the present invention are described below.

The biodegradable resins used in the present invention may include, but are not limited to, polylactic acid, biodegradable aliphatic copolyesters prepared by polycondensation, lactone resins, biodegradable cellulose esters, polypeptides, polyvinyl alcohol, starch, cellulose, chitin, chitosan and natural linear polyesters. More particularly, synthetic polymers including, for example, polylactic acid, aliphatic polyesters prepared by polycondensation of diol and dicarboxylic acid and its derivatives such as polyethylene succinate prepared by polycondensation of ethylene glycol and succinic acid or its derivatives, polybutylene succinate prepared by polycondensation of butane diol and succinic acid or its derivatives, polybutylene succinateadipate prepared from butane diol with succinic acid or adipic acid or derivatives thereof as dicarboxylic acid, polybutylene succinatecarbonate obtained by polycondensation of butane diol and succinic acid, followed by chain-extension with carbonate compounds such as diethyl carbonate may be used. Also, lactone resins including, for example, ε-caprolactone, β-propiolactone, γ-butyrolactone, δ-valerolactone, enantolactone, or various methylated lactones such as 4-methyl caprolactone, 2,2,4-trimethyl caprolactone, 3,3,5-trimethyl caprolactone, etc. may be used. Furthermore, biodegradable aromatic copolyesters including, for example, polyethylene terephthalate/succinate copolymer, polyethylene terephthalate/adipate copolymer, polyethylene terephthalate/sebacate copolymer, polyethylene terephthalate/dodecadionate copolymer, polybutylene terephthalate/succinate copolymer, polybutylene terephthalate/adipate copolymer, polybutylene terephthalate/sebacate copolymer, polybutylene terephthalate/dodecadionate copolymer, polyhexylene terephthalate/succinate copolymer, polyhexylene terephthalate/adipate copolymer, polyhexylene terephthalate/sebacate copolymer and polyhexylene terephthalate/dodecadionate copolymer may be used. Biodegradable cellulose esters including, for example, cellulose acetate, cellulose butyrate, cellulose propionate, cellulose nitrate, cellulose sulfate, cellulose acetate butyrate, and cellulose nitrate acetate may be used. Also, synthetic polymers including, for example, polypeptides such as polyglutamic acid, polyaspartic acid and polyrosin, and polyvinyl alcohol may be used.

Furthermore, natural polymers including, for example, raw starch such as corn starch, wheat starch and rice starch, and modified starch such as esterified starch acetate, methyl esterified starch and amylose, and natural linear polyesters such as cellulose, carageenan, chitin, chitosan, polyhydroxy butyratevalerate may be used.

Copolymers of a component constituting such biodegradable resins also may be used.

Also, such biodegradable resins may be used alone or in any combination thereof.

Among such biodegradable resins, the preferred resins are polylactic acid, aliphatic polyesters prepared by polycondensation of diol and dicarboxylic acid and its derivatives, biodegradable aromatic copolyesters prepared by polycondensation of dicarboxylic acid components including aromatic dicarboxylic acid and its derivatives and aliphatic dicarboxylic acid and its derivatives and diol components including aliphatic diol, and lactone resins.

The ratio of a biodegradable resin based on the total resin components in the resin composition is not particularly limited to a specific range. It is preferably, however, at least about 50 wt %, and more preferably at least about 70 wt %. The larger ratio of a biodegradable resin is preferred because it leads to the greater decomposition rate and shape degradation rate after decomposition. Other resin components to be added in addition to a biodegradable resin include, but are not limited to, ultra low density polyethylene, low density polyethylene, linear low density polyethylene, medium density polyethylene, high density polyethylene, ultra high molecular weight polyethylene, polypropylene, ethylene-propylene rubber, polyvinyl acetate, polybutene, etc.

The expansion rate of the foam sheet according to the present invention is preferably about 1.5 to about 50, and more preferably about 5 to about 40. If the expansion rate is less than about 1.5, the sheet may not be sufficiently lightweight and flexible. Also, if the expansion rate is more than about 50, the mechanical properties and processability of the sheet may become deteriorated. The expansion rate, as used herein, shall mean a reciprocal number of an apparent density of foam, in accordance with JIS K6767.

The gel fraction of the foam sheet according to the present invention is at least about 3%. It is preferably about 5% to about 80%, and more preferably about 15% to 70%. When the gel fraction is lower than about 3%, the foamable resin composition lacks sufficient melt viscosity, and thus the production process can be unsteadable. Moreover, the secondary processability of the foam sheet may become deteriorated. When the gel fraction is higher than about 80%, the foamability may also become deteriorated and, consequently, the foam sheet can have low flexibility which is unfavorable.

The gel fraction, as used herein, is calculated as follows:

A foamed sheet is carefully weighed out about 50 mg, then immersed in 25 ml chloroform at 25° C. for 3 hrs. At the end of this period, the solution is filtered with a 400 mesh stainless wire net. The unsolved solids on the wire net are dried in a vacuum oven. Then, the dried solids obtained are weighed, and the gel fraction is calculated in percentage according to the following formula:

Gel Fraction (%)=[a weight of unsolved solids (mg)/a weight of a foam sheet before immersion in chloroform (mg)]×100

A crosslinking promoter to be used in the present invention should not be specifically limited in any way, provided that it is a multifunctional monomer having at least two unsaturated bonds in a molecule. Multifunctional monomers that are already known to a person of ordinary skill in the art are, for example, acrylates or methacrylates such as 1,6-hexane diol dimethacrylate, ethylene glycol diacrylate, ethylene glycol dimethacrylate, trimethylol propane trimethacrylate, tetramethylol methane triacrylate, 1,9-nonane diol dimethacrylate and 1,10-decane diol dimethacrylate; allyl esters of carboxylic acid such as trimellitic acid triallyl ester, pyromellitic acid triallyl ester and oxalic acid diallyl ester; allyl esters of cyanulic acid or isocyanulic acid such as triallyl cyanurate and triallyl isocyanurate; maleimide compounds such as N-phenyl maleimide and N,N'-m-phenylene bismaleimide; compounds having at least two tribonds such as phthalic acid dipropagyl and maleic acid dipropagyl; divinyl benzene. Such types of monomers may be used as a crosslinking promoter in the present invention.

Among the exemplary types of multifunctional monomers listed above, the preferred ones are hydrolyzable because of their easy handling, versatility and biodegradability. Especially preferred ones are multifunctional ester monomers. Crosslinking promoters such as methacrylates and acrylates are also preferably used. Among them, 1,6-hexane diol dimethacrylate is especially preferable.

The above-identified multifunctional monomers may be used alone or in any combination thereof. If the amount of added multifunctional monomer is too low, a crosslinked foam sheet of desirable quality cannot be obtained. If the added amount is too high, the processability of the obtained foam sheet may become deteriorated. Thus, the amount of added monomer is preferably in the range of from about 0.5 to about 10 parts by weight, and more preferably from about 1 to about 6 parts by weight based on 100 parts by weight of the resin composition.

A thermal decomposable blowing agent that is used in the present invention may be chosen from various types currently available. However, the chosen blowing agent preferably has a thermal decomposition temperature. Such types of blowing agents include, but are not limited to, azodicarbonamide, benzenesulfonyl hydrazide, dinitrosopentamethylene tetramine, toluenesulfonyl hydrazide, azobisisobutyronitrile, barium azodicarboxylate, bicarbonates such as sodium bicarbonate and the like. It may be employed alone or in any combination, preferably in an amount of about 1 to about 50 parts by weight, and more preferably from about 4 to about 25 parts by weight based on 100 parts by weight of the resin composition. It should be noted herein that if the added amount of the thermal decomposable blowing agent is too low, foamability of the resin composition may become deteriorated. On the other hand, if the added amount is too high, strength and thermal resistance of the foam sheet may become deteriorated.

As the particle size of such blowing agent becomes smaller, the thermal decomposition rate thereof becomes higher. Consequently, the cells then become larger. On the contrary, if the particle size becomes larger, then the thermal decomposition rate becomes lower. As such, in order to obtain a foam sheet having a uniform cell diameter, the average particle size of the blowing agent is preferably in the range of from about 3 to about 30 μm, and more preferably from about 5 to about 28 μm.

If the difference between the decomposition temperature of the thermal decomposable blowing agent and the melting point of the biodegradable resin is high, then a catalyst for the blowing agent decomposition may be used. The exemplary catalyst may include, but is certainly not limited to, zinc oxide, magnesium oxide, calcium stearate, glycerin, urea and the like.

In the foam sheet according to the present invention, the thermoforming ratio is preferably in the range of from about 0.50 to about 2.00. The foam sheet is heated in a female mold of perpendicular cylinder shape having a diameter D and a height H under optimal heating conditions. It is also subjected to straight molding with a vacuum molding machine. It should be expressed that the H/D limit value at which the foam sheet is capable of being stretched and elongated into a cylinder shape without breaking down is the thermoforming ratio described herein. Herein, the diameter D is 50 mm. In many cases, the optimal heating conditions mentioned above are generally in the range of from about 40° C. below melting point of resin to about 60° C. above melting point of resin. In case of using at least two different resins, however, the optimal heating conditions are not so or vary. If the thermoforming ratio is generally less than about 0.50, it may be difficult to fabricate the present foam sheet into a complicated shape.

Additionally, at least one of the surfaces of the present foam sheet may be laminated, preferably with a skin material. Examples of acceptable skin material may include, but are not limited to, sheet-like materials such as film, sheet, cloth such as knitting fabrics or nonwoven fabrics, natural leather, paper and the like.

The skin material utilized in the present invention may be bonded before, upon or after molding the present crosslinked biodegradable resin continuous foam sheet when it is strategically shaped by a vacuum molding method or a press molding method. The sheet-like materials and cloth which comprise biodegradable resin as a major component are preferred types of skin materials to be used in the present invention.

In the present invention, the biodegradable resin may be, but is in no way limited to, synthetic polymers including polylactic acid, aliphatic polyesters prepared by polycondensation of diol and dicarboxylic acid and its derivatives such as polyethylene succinate, polybutylene succinate, polybutylene succinate adipate, and polybutylene succinate carbonate. Furthermore, lactone resins which include, for example, ε-caprolactone, β-propiolactone, γ-butyrolactone, δ-valerolactone, enantolactone, or various methylated lactones such as 4-methyl caprolactone, 2,2,4-trimethyl caprolactone, 3,3,5-trimethyl lactone, etc. may also be used as the biodegradable resin. Moreover, biodegradable aromatic copolyesters including, for example, polyethylene terephthalate/succinate copolymer, polyethylene terephthalate/adipate copolymer, polyethylene terephthalate/sebacate copolymer, polyethylene terephthalate/dodecadionate copolymer, polybutylene terephthalate/succinate copolymer, polybutylene terephthalate/adipate copolymer, polybutylene terephthalate/sebacate copolymer, polybutylene terephthalate/dodecadionate copolymer, polyhexylene, terephthalate/succinate copolymer, polyhexylene terephthalate/adipate copolymer, polyhexylene terephthalate/sebacate copolymer, polyhexylene terephthalate/dodecadionate copolymer may additionally be used as the biodegradable resin. Biodegradable cellulose esters including, for example, cellulose acetate, cellulose butyrate, cellulose propionate, cellulose nitrate, cellulose sulfate, cellulose acetate butyrate, and cellulose nitrate acetate may also be used. Synthetic polymers including, for example, polypeptides such as polyglutamic acid, polyaspartic acid, polyrosin, and polyvinyl alcohol may be used as well.

Natural polymers including, for example, raw starch such as corn starch, wheat starch and rice starch, modified starch such as esterified starch acetate, methyl esterified starch and amylose, and natural linear polyester such as cellulose, carageenan, chitin, chitosan and polyhydroxy butyrate valerate may further be used as the biodegradable resin. Copolymers of a component constituting such biodegradable resins may also be used.

The above-described biodegradable resins may be used individually or in various combinations. Also, skin materials containing other types of resins in addition to the biodegradable resin may be used as well. Such types of resins include, but are not limited to, ultra low density polyethylene, low density polyethylene, linear low density polyethylene, medium density polyethylene, high density polyethylene, ultra high molecular weight polyethylene, polypropylene, ethylene-propylene rubber, polyvinyl acetate and polybutene.

It should further be stated herein that skin materials which comprise resins other than the biodegradable resins, for example, polyethylene, polypropylene, ethylene-propylene rubber, polyvinyl acetate, ABS, polyvinyl chloride, polyethylene terephthalate, polybutylene terephthalate and polyacrylonitrile may also be used.

Any methods that are well known and currently existing in the art may be used for laminating the foam sheet of the present invention with the skin material. Such methods of lamination may include, but are not limited to, adhesive bonding, thermal bonding, extrusion lamination and the like.

Any known adhesive agents in the art may be used for adhesive bonding. Examples of such adhesive agents may include rubber adhesives, olefin adhesives, polyimide adhesives, epoxy adhesives, urethane adhesives, phenol adhesives, acrylic adhesives and the like. Among the types of adhesive agents described above, it is indicated herein that urethane adhesives are preferred over the others. Among these urethane adhesives, one whose polyol capable of reacting with polyisocyanate is of ester type is preferably used. In this case, corona discharge treatment is not necessary as well as a small amount of application is sufficient and adequate. This is because they have good compatibility with the crosslinked foam sheet comprising a biodegradable polyester resin.

If the skin material of biodegradable resin constituting the crosslinked continuous foam sheet is employed in thermal bonding or extrusion lamination, then the bonding strength may be preferably increased.

In the foam sheet according to the present invention, the crosslinked foam sheet having a gel fraction of at least about 50% is preferably used in a method for obtaining a molding article by bonding a skin material on a surface of the sheet and integrally molding a substrate comprising a thermoplastic resin on the opposite surface of the sheet.

The molding article may be prepared by the following process but in no way should be limited thereto:

First, the skin material that is described above is bonded on a surface of the crosslinked foam sheet comprising a biodegradable resin. This may be achieved through any known method which is currently available, such as adhesive bonding or extrusion lamination, so as to form a complex.

Thereafter, the complex comprising the skin material and the crosslinked foam sheet is placed into a mold. If low pressure molding is used, then the complex is disposed between the top and bottom halves of the mold. If injection press molding is implemented, then it is positioned between the right and left halves of the mold.

Subsequently, melted thermoplastic resins (substrate) are injected into the mold from an injection gate located about the bottom half thereof. Almost simultaneously therewith, the top and bottom halves of the mold are closed together to spread the melted resins in the mold. As a result, molding of the substrate and integration of the complex occur simultaneously. In this respect, a molding article such as an interior material for an automobile may be obtained.

Generally, the temperature of the melted resin upon injection and introduction into the mold is adjusted to at least about 20° C. above melting point of the resin in order to provide flowability. Also, the injection pressure can be adjusted as high as about 1 to about 10 MPa, with maximum pressure being about 40 MPa. The crosslinked biodegradable resin foam sheet introduced into the mold should resist such temperature and pressure.

In the integral molding described above, if the thermoplastic resin and the crosslinked biodegradable resin foam sheet are of similar kind, then contact surfaces between them may be bonded by thermal bonding. On the contrary, if they have no affinity or compatibility for each other, then the bonding strength between the contact surfaces may be weak and not adequately strong enough. In such case, an adhesive agent can be pre-applied onto the bonding surface of the crosslinked biodegradable resin foam sheet. Or alternatively, a hot melt film can be interposed between the contact surfaces.

By using a method involving reducing press pressure, even a crosslinked foam sheet having a gel fraction of less than 50% may be used for molding.

An average cell size of the present foam sheet is preferably in the range of from about 0.05 to about 1 mm. More preferably, it is from about 0.1 to about 0.9 mm, and even more preferably from about 0.15 to about 0.8 mm. If the average cell size is lower than about 0.05 mm, then the sheet has a reduced flexibility. If the average cell size is larger than about 1 mm, however, then the sheet has an uneven surface. There is also a possibility of the sheet being undesirably torn at its largely stretched portion or portions when it is subjected to a secondary process.

In addition, the foam sheet according to the present invention satisfies the following relationship between the average values (a) and (b) of cells:

$$0.3 \leq (a)/(b) \leq 1.2, \text{ preferably } 0.5 \leq (a)/(b) \leq 1.0.$$

For the average value (a) of the cells, the center is located within the range from about the surface of the sheet to about 20% portion in the direction of the thickness thereof. For the average value (b) of the cells, the center is located within the inner layer portion corresponding to about the middle 60% in the direction of the thickness of the sheet.

If the ratio is less than about 0.3 which may signify that the cell size of the surface layer is too small, then the surface of the foam sheet may be or become unfavorably hard. Thus, the sheet of the present invention is readily crimpled when it is subjected to a secondary process. If the ratio is greater than about 1.2 which may indicate that the cell size of the surface layer is too large, then the evenness of the sheet surface may be or become undesirably deteriorated.

The cell size of the present foam sheet can be measured as follows:

The foam sheet is first perpendicularly cut into a selected section along its length and width. Then, a photograph of that section is taken at fifty (50) magnifications with an electron microscope. On this photograph, all cells, of which the center is located within the rectangle with two surface layers of the sheet and two parallel lines of 150 mm width, are accounted for and their diameters in the direction of the thickness are thereafter measured. Then, the average value of these diameters is calculated to derive the average cell size.

Further on this photograph, the surface layer of the present foam sheet is connected with 20% position in the direction of the thickness from the surface layer sheet by two parallel lines of 150 mm width. All cells, of which the center is located within the rectangle with the four lines, are accounted for and their diameters in the direction of the thickness are measured in order to calculate the average value (a) of these diameters. In case of inner layer portion, all cells, of which the center is located within the rectangle with 20% positions in the direction of the thickness from each of two surface layers of the foam sheet and two parallel lines of 150 mm thickness perpendicular to those 20% positions, are measured as specified above to obtain the average value(b).

As described above, the diameter of the cell in the direction of the thickness can be controlled by controlling a gel fraction of the foam sheet in and along that same direction. After forming a resin composition comprising a biodegradable resin, a thermal decomposable blowing agent and a crosslinking promoter into, the sheet, an irradiation procedure with an electron beam is first performed at an acceleration voltage of as low as 200 kV or under conditions in which the distance is shortened with titanium plate to crosslink the surface layer portion. Subsequently, it is performed at an acceleration voltage of as high as 800 kV such that a high gel fraction may be obtained at the surface layer portion. Thus, the surface layer portion of the foam sheet thus obtained has a high gel fraction so that the cells therein or thereabout are fine and the cells in the inner layer portion are generally large. Furthermore, control of the diameter of cell in the direction of the thickness can be accomplished by laminating or coextruding several sheets with different amounts of thermal decomposable blowing agent and crosslinking promoter, and then performing crosslinking and foaming. This can also be accomplished by providing a variable temperature profile from an opening to an exit of a foaming oven where a thermal decomposable blowing agent is decomposed. For example, when the temperature upon foaming is lowered, then the thermal decomposition rate of the blowing agent of exothermic decomposition type is also lowered which leads to a smaller size of the cell. On the contrary, a higher temperature upon foaming indicates that the thermal decomposition rate is also high, signifying a larger size of the cell. Thus, the temperature at the early stage of foaming is set to low so that fine cells can be formed in the surface layer portion. The temperature at the late stage of foaming is set to high so that large cells can be formed in the inner layer portion.

The foam sheet of the present invention has a maximum tensile elongation at a temperature range of from about 40° C. to about 160° C., with the maximum value preferably being at least about 200%. If the temperature reaching the maximum tensile elongation is lower than about 40° C., then the dimensional stability of the molding article at about the room temperature becomes remarkably deteriorated. Also, if the temperature is higher than about 160° C., then the heating time required to mold the foam sheet-becomes too long, resulting in a slow cycle time. As a result, the productivity could be decreased and significantly dampened.

If the temperature reaching the maximum tensile elongation is lower than about 40° C. or higher than about 160° C., then the molding article obtained by vacuum or press molding of the present laminated sheet can be readily inflated or crinkled at the surface. Further, if the tensile elongation of the foam sheet is less than about 200%, then the foam sheet tends to become torn at largely stretched portion or portions upon molding.

Herein, the tensile elongation of the foam sheet according to the present invention is determined in accordance with JIS K6767. The tensile elongation at high temperature is determined after heating a specimen for 5 min in a hot air oven that is set to a prescribed temperature.

The foam sheet of the present invention has a wide variety of applications such as, for example, interior materials for an automobile including door, instrument panel, seat back garnish, console box, roof and floor mat; various insulators including dash panel insulator and rear side trim insulator; trunk side; wheel house cover; thermal insulators including pipe covering, spiral hose and long roof; cushion materials including various mats such as desk mat and floor mat, and shock-absorbing materials such as paper core; sealant for substrate or tile including packing material and adhesive tape, etc.

To satisfy the requirements for such different types of applications, the foam sheet of the present invention may be subjected to various secondary processes such as embossing, corona treatment, slicing, hole punching, bonding process, primer process, lamination, vacuum molding, compression molding, low pressure molding, injection molding, injection press molding and the like.

To further satisfy the requirements for such various types of applications, other additives, in addition to a thermal decomposable blowing agent and a crosslinking promoter, may be also added within and up to a range which will not deteriorate the effects of the present invention. Such types of additives include, but are not limited to, organic peroxide, antioxidant, lubricant, thermal stabilizer, dye, flame retardant, antistatic agent, nucleating agent, plasticizer, antibiotic agent, biodegradation promoter, catalyst for blowing agent decomposition, light stabilizer, UV absorbent, anti-blocking agent, filler, deodorizer, thickener, cell size stabilizer, metal deactivator, and any combination thereof Since the crosslinked biodegradable resin continuous foam sheet of the present invention is preferably in a sheet form, its productivity is excellent and its biodegradation rate is high. The thickness of the present foam sheet is preferably in the range of from about 0.1 mm to about 100 mm. A secondary process such as slicing or bonding after foaming can accomplish such desired thickness.

The preferred embodiments of the method for producing the crosslinked biodegradable resin continuous foam sheet of the present invention are described in detail.

The method of the present invention comprises the steps of. (1) preparing a sheet from a resin composition comprising a biodegradable resin, a thermal decomposable blowing agent and a crosslinking promoter; (2) irradiating the resulting sheet with an ionizing radiation to crosslink the resin composition; and (3) subjecting the crosslinked sheet to heat treatment to continuously prepare a crosslinked foam sheet.

A specific example of the present method is described below.

A resin composition comprising a biodegradable resin, a thermal decomposable blowing agent and a crosslinking promoter is melted at a temperature range generally below a decomposition temperature of a thermal decomposable blowing agent and kneaded with a kneading device such as single screw extruder, twin screw extruder, Banbury mixer, kneader mixer or mixing roll. It is then formed into a sheet form. Before melting and kneading, the resin composition may be mechanically mixed by a mixer, if necessary. If also necessary, the biodegradable resin may be dried in a hopper or a vacuum drier. The melting and kneading temperature is preferably at least about 10° C. lower than the decomposition initiating temperature of a blowing agent. If such temperature is too high, then the thermal decomposable blowing agent may become decomposed upon kneading which typically results in undesirable foams. Preferably, a crosslinking promoter may be introduced by being added and mixed with a Henshel mixer before melting and kneading. It can also be added through a feeding gate of an extruder or through a vent opening of an extruder equipped with a vent.

Also, the thickness of this sheet is preferably in the range of from about 0.1 mm to about 50 mm, and more preferably from about 0.2 mm to about 40 mm, and even more preferably from about 0.3 mm to about 30 mm. If the thickness of the sheet is lower than about 0.1 mm, then there is a problem—significant gas leakage from the sheet surface upon foaming molding. Thus, a uniform foam could not be obtained. If the thickness is higher than about 50 mm, then the sheet becomes so stiff in a manner as not to be easily woundable in continuous process.

Subsequently, the resin composition in the sheet is subjected to irradiation with an ionized radiation at a given exposure to crosslink the composition, thereby obtaining the crosslinked sheet.

In the present invention, the resin composition may be crosslinked by any conventionally known methods, for example, a method of irradiating with an ionized radiation at a given exposure and a method of crosslinking with an organic peroxide or silane. It should be noted herein that the method of irradiating with an ionized radiation produces a foam sheet which has an excellent surface appearance and uniform cells. When using an ionized radiation in the past, a foam sheet having sufficient crosslinking degree could not be continuously prepared from a biodegradable resin. However, the present inventors have found that a biodegradable resin can be sufficiently crosslinked with an ionized radiation by coexisting a multifunctional monomer having at least two unsaturated bonds in a molecule, thus accomplishing the present invention.

Examples of ionized radiations include, but certainly are not limited to, alpha rays, beta rays, gamma rays, electron beams and the like. Among them, an electron beam having uniform energy is preferably used in the present invention. Exposure and irradiation frequency of an ionized radiation, as well as an acceleration voltage upon irradiation with an electron beam, can vary widely depending on the intended gel fraction and the thickness of a subject to be irradiated. However, it should generally be in the range of from about 10 to about 500 kGy, and preferably from about 20 to about 300 kGy, and more preferably about 20 to about 200 kGy. If the exposure is too low, then the cells are maintained upon foaming molding so that sufficient melt viscosity cannot be obtained. If the exposure is too high, however, the molding processability of the foam sheet may become deteriorated, or alternatively, the resin itself may suffer severe degradation. Thus, a desirable foam sheet cannot be obtained. Upon irradiation, the resin is also softened by an exothermic heat so that the sheet can be deformed or broken down.

Also, the irradiation frequency is preferably about 4 times or less, and more preferably about 2 times or less. If the irradiation frequency is more than about 4 times, then the resin may suffer degradation so that upon foaming, the cells cannot be uniformly formed.

In case that the thickness of the sheet is greater than about 4 mm, a method of irradiating both surfaces of the sheet with an ionized radiation (i.e., two times irradiation of an ionized radiation) is preferably utilized as a method for making the gel fraction of the surface layer and the inner layer to be uniform.

Further, irradiation with an electron beam provides an advantage in that the resin in the subjects of various thicknesses can be effectively crosslinked by controlling an acceleration voltage of electron. The acceleration voltage is generally in the range of from about 200 to about 1500 kV, and preferably from about 400 to about 1200 kV, and more preferably about 600 to about 1000 kV. If the acceleration voltage is less than about 200 kV, then the radiation cannot reach the inner portion so that upon foaming, the cells in the inner portion can be coarse and uneven. If the acceleration voltage is greater than about 1500 kV, then the resin can suffer degradation.

In the present invention, foaming is generally accomplished by heating a crosslinked resin composition to a temperature higher than the thermal decomposition temperature of a thermal decomposable blowing agent.

Subsequently, this crosslinked sheet is subjected to heat treatment at a temperature higher than the thermal decomposition temperature of a thermal decomposable blowing agent in order to foam the sheet. The heat treatment may be carried out by any known methods. For example, the heat treatment may be carried out using a vertical or horizontal hot air foaming oven or a chemical bath such as a molten salt bath. In case that a resin such as aliphatic polyesters, which is readily hydrolyzed, is used as a biodegradable resin, foaming in a vertical or horizontal hot air foaming oven provides a foam sheet with a good surface, and is thus preferred over the chemical bath. Additionally, before foaming molding, the resin can be preferably softened with preheating, if necessary. This enables a stable foam sheet to be obtained by a low amount of heat.

In the present invention, any excess or worthless crosslinked biodegradable resin foam and/or its condensing material may be added to the new resin composition. Such foam may be formed at the start and stop of the manufacturing process, and may also result from trimmings of edge that are formed during the manufacturing process. For the purposes of improving product yield and reducing wastes, those foams may be applied to the continuous manufacturing process of the crosslinked biodegradable resin continuous foam sheet of the present invention. This is greatly different, but clearly more advantageous, over the polyolefin resin foams of the prior art wherein any similar wastes were simply and inevitably disposed.

It is preferred that such foam and/or its condensing material is previously cut into a chip. The foam may be condensed by any known conventional methods, for example, a method of defoaming and condensing the foam by compressing the foam with a mixing roll, a method of condensing the foam by extruding the foam with an extruder, and a method of condensing the foam by dissolving the foam into a solvent. In a method of condensing the foam by extruding the foam with an extruder, alcohol such as butane diol or ethylene glycol, acid or alkaline aqueous solution such as aqueous sodium hydroxide, aqueous potassium hydroxide, hydrochloric acid, sulfuric acid, and water may be preferably added in a small amount since they act as a plasticizer. Particularly, when the biodegradable resin constituting the crosslinked foam sheet is a polyester resin, the polyester resin is hydrolyzed by the solvent mentioned above which decreases the molecular weight thereof. This induces an increase in flowability. Thus, the foam sheet will be readily recycled and the productivity will be improved.

EXAMPLES

The present invention is described in better detail below in view of the following examples. However, the examples provided below are not intended to restrict the scope of the present invention in any way. In addition, surface appearance, yellowing index, thermal resistance, recyclability, thermoforming ratio and low pressure molding processability were evaluated as follows:

(Biodegradability Evaluation)

The prepared foam sheet was cut into a 5 cm×5 cm piece. The piece was then buried at 15 to 20 cm depth under the soil surface next to a reservoir of Toray Industries, Inc. located in Shiga-ken, Otsu-shi, Japan. After about 1 year, the piece was unburied and weighed. The biodegradability was evaluated on the basis of the following criterion:

Biodegradability ⊚: At least 50% weight reduction within 1 year.

Biodegradability ○: At least 30% weight reduction within 1 year.

Biodegradability x: No change in weight after 1 year.

(Surface Appearance Evaluation)

The surface roughness was measured using a surface roughness tester (manufactured by Kosaka Laboratory Ltd., Product name: SURFCORDER SE-2300). The surface appearance was evaluated with the measured Ra75 value on the basis of the following criterion:

Surface appearance ○: Ra75 value<25 μm.

Surface appearance x: Ra75 value≧25 μm.

(Yellowing Index Evaluation)

The yellowing index was measured using a SM color computer (manufactured by Suga Test Instruments Co., Ltd.), and was then evaluated with YI value on the basis of the following criterion:

Yellowing index ⊚: YI value≦35.

Yellowing index ○: YI value=36~45.

Yellowing index x: YI value≧46.

(Thermal Resistance Evaluation)

The foam sheet was precisely cut into a 15 cm×15 cm piece. The piece was then placed in an oven at 100° C. for 60 min. After 60 min, the piece was removed from the oven and then allowed to cool at room temperature for about 30 to 60 min. The dimensions of the piece were measured to calculate the dimensional change in percentage using the formula provided below. The thermal resistance was evaluated on the basis of the following criterion:

Thermal resistance ⊚: Dimensional change≦±3%.

Thermal resistance ○: Dimensional change≦±5%.

Thermal resistance x: Dimensional change>±5%.

Dimensional change by heating (%)=[(length of a sample before being placed in an oven−length of a sample after being removed from an oven)/length of a sample before being placed in an oven]×100

(Recyclability Evaluation)

Recyclability, as used herein, means that an excess or worthless foam that can be used as a raw material for the preparation of a next foam.

The prepared foam was defoamed using a mixing roll so as to be formed into a condensing material. The condensing material was cut into a chip with a size of 5 to 7 mm and a thickness of 1 to 3 mm. The chip was then mixed with the same resin as that of the condensing material in various ratios. Thereafter, the required amounts of a thermal decomposable blowing agent and a crosslinking promoter were added. The composition was made into a sheet, and irradiation and foaming processes were performed to prepare a crosslinked biodegradable resin continuous foam sheet. The recyclability was evaluated on the basis of the following criterion:

Recyclability ○: Capable of being formed into a foam sheet again.

Recyclability x: Incapable of being formed into a foam sheet again.

(Thermoforming Ratio Evaluation)

When heating a foam sheet in a female mold of perpendicular cylinder shape with a diameter D and a height H and subjecting the same to straight molding with a vacuum molding machine, the H/D limit value at which the foam sheet is capable of being stretched and elongated into a cylinder shape without breaking down is the thermoforming ratio. Herein, the diameter D was 50 mm. The thermoforming ratios were measured at six (6) surface temperatures of the foam sheet, i.e. about 100, 120, 140, 160, 180, 200° C. These measured values were evaluated on the basis of the following criterion:

Thermoforming ratio ⊚: Thermoforming ratios at all temperatures are 0.50 to 2.00.

Thermoforming ratio ○: Thermoforming ratios at least 4 temperatures are 0.50 to 2.00.

Thermoforming ratio x: Thermoforming ratios at less than 3 temperatures are at least 0.50.

(Low Pressure Molding Processability Evaluation)

Foam sheets prepared in Examples 8 and 9 and Comparative Example 10 were tested. Knitted fabric consisting of cupra as a skin material was laminated on these foam sheets by flame lamination to obtain laminations.

After then, the complex was placed in a mold, and polybutylene succinate (PBS) #1020 (manufactured by Showa High Polymer Co., Ltd.) was injected and introduced from the bottom mold. Simultaneously, the top and bottom molds were closed together with a pressure of 5 MPa. The pressure was maintained. Subsequently, integral molding with the complex was carried out along with substrate molding. Ten (10) molding articles were prepared. The low pressure molding processability was evaluated with the ten molding articles on the base of the following criterion:

Low pressure molding processability ⊚: No hole in surface of all molding articles.

Low pressure molding processability ○: Hole in surface of no more than two molding articles.

Low pressure molding processability x: Hole in surface of at least three molding articles.

Example 1

100 kg of polybutylene succinate (PBS) (manufactured by Showa High Polymer Co., Ltd., Product name: Bionole #1003) as a biodegradable resin, 7.0 kg of azodicarbonamide as a blowing agent, 3.0 kg of 1,6-hexane diol dimethacrylate as a crosslinking promoter, and 0.3 kg of each of Irganox 245 (manufactured by Ciba Specialty Chemicals) and AO-412S (manufactured by Asahi Electrochemical Co., Ltd.) as a stabilizer were introduced into a twin screw extruder equipped with a vent and heated to a temperature incapable of decomposing the blowing agent (i.e., 160° C.). It was then extruded from a T-die to produce a sheet with a thickness of 1.5 mm for crosslinking and foaming. This sheet was exposed to 55 kGy electron beam at an acceleration voltage of 800 kV to crosslink the sheet. Subsequently, the sheet was continuously introduced into a vertical hot air foaming device and foamed at 230° C. for 3-4 min. Then, the crosslinked foam in the continuous sheet form thus obtained thereby was wound.

The foam sheet had a thickness of 4.0 mm, a gel fraction of 38% and an expansion rate of 16. It also exhibited good surface morphology, excellent appearance and shape maintenance. Cells in the foam sheet were uniform.

Example 2

A foam sheet was prepared in the same manner as in Example 1 except that polybultylene succinate/adipate (PBS/A) (manufactured by Showa High Polymer Co., Ltd., Product name: Bionole #3003) was used as a biodegradable resin.

The foam sheet had a thickness of 3.7 mm, a gel fraction of 40% and an expansion rate of 20. It also exhibited good surface morphology, excellent appearance and shape maintainance. Cells in the foam sheet were uniform.

Example 3

A foam sheet was prepared in the same manner as in Example 1 except that polybutylene succinate terephthalate (PBT/A) (manufactured by BASF Japan Ltd., Product name: Ecoflex) was used as a biodegradable resin and the electron beam exposure was 80 kGy.

The foam sheet had a thickness of 2.8 mm, a gel fraction of 22% and an expansion rate of 15. It also exhibited good surface morphology, excellent appearance and shape maintenance. Cells in the foam sheet were uniform.

Example 4

A foam sheet was prepared in the same manner as in Example 1 except that polycaprolactone (PCL). (manufactured by Daicel Chemical Industries, Ltd., Product name: Placcel #PHB-02) was used as a biodegradable resin.

The foam sheet had a thickness of 3.8 mm, a gel fraction of 42% and an expansion rate of 20. It also exhibited good surface morphology, excellent appearance and shape maintenance. Cells in the foam sheet were uniform.

Example 5

A foam sheet was prepared in the same manner as in Example 1 except that polylactic acid (PLA) (manufactured by Cargill Dow LLC, Product name: L4040D) was used as a biodegradable resin, 1,6-hexane diol dimethacrylate was used in an amount of 7 parts, and the extrusion temperature, the electron beam exposure and the foaming temperature were 170° C., 80 kGy and 240° C., respectively.

The foam sheet had a thickness of 2.8 mm, a gel fraction of 27% and an expansion rate of 11. It also exhibited high hardness and thermal resistance, good surface morphology, excellent appearance and shape maintenance. Cells in the foam sheet were uniform.

Comparative Example 1

A foam sheet was prepared in the same manner as in Example 1 except that 70 kg of polypropylene resin prepared by random copolymerization of propylene and 5.2 wt % ethylene, of which a Melt Index (MI) was 2.2 g/10 min, 30 kg of polyethylene, of which a MI was 9.5 g/10 min, and 0.45 kg of Irganox 1010 (manufactured by Ciba Specialty Chemicals) and 0.3 kg of Irganox PS802 (manufactured by Ciba Specialty Chemicals) as a stabilizer, 6.4 kg of azodicarbonamide as a blowing agent and 5.0 kg of 1.6-hexane diol dimethacrylate were employed. The other notable points of difference in the preparation method were the extrusion temperature, the electron beam exposure and the foaming temperature which were 175° C., 55 kGy and 240° C., respectively.

The foam sheet had a thickness of 3.0 mm, a gel fraction of 50% and an expansion rate of 15. It also exhibited good surface morphology, excellent appearance and shape maintenance.

Each of the foam sheets obtained in Examples 1 to 5, and Comparative Example 1 was buried under the soil. They were then unburied so that their conditions can be observed after 1 year. After observation, the foam sheets of Examples 1 to 5 were fully decomposed. However, the foam sheet of Comparative Example 1 maintained its original shape without any biodegradation.

Example 6

The trimming portion of the edge generated upon preparing the foam sheet of Example 1 was defoamed with a mixing roll to produce the condensing material of the crosslinked biodegradable resin continuous foam sheet. The condensing material was placed in a cutter to be formed into a chip with a side length of about 5 mm.

10 kg of the chip and 90 kg of polybutylene succinate (PBS) used in Example 1 were employed. Further as in Example 1, 7.0 kg of azodicarbonamide as a blowing agent, 3.0 kg of 1,6-hexane diol dimethacrylate as a crosslinking promoter, 0.3 kg of each of Irganox 245 (manufactured by Ciba Specialty Chemicals) and AO-412S (manufactured by Asahi Electrochemical Co., Ltd.) as a stabilizer were added to prepare a foam sheet in the same manner as in Example 1.

The foam sheet had a thickness of 3.9 mm, a gel fraction of 49% and an expansion rate of 20. It also exhibited good surface morphology and excellent appearance without any blots along the direction of the width as that prepared in Example 1.

Example 7

A foam sheet was prepared in the same manner as in Example 6 except that the foam sheet obtained in Example 2 and polybutylene succinate/adipate used in Example 2 were employed.

The foam sheet had a thickness of 3.5 mm, a gel fraction of 47% and an expansion rate of 18. It also exhibited good surface morphology and excellent appearance without any blots along the direction of the width as that prepared in Example 2.

Comparative Example 2

A foam sheet was prepared in the same manner as in Example 6 except that the foam sheet obtained in Comparative Example 1 and polypropylene resin and polyethylene resin used in Comparative Example 1 were used. However, a foam sheet could not be formed since the viscosity of the condensing material was so high that the extruder tip became blocked and the polymer flowed backward at the vent opening.

As seen in Examples 6 and 7, the crosslinked foam sheets obtained in Examples 1 and 2 had excellent recyclability.

However, as seen in Comparative Example 2, the crosslinked foam sheet obtained in Comparative Example 1 had poor recyclability, and thus should be inevitably disposed.

Example 8

A foam sheet was prepared in the same manner as in Example 1 except that 1,6-hexane diol dimethacrylate was used in an amount of 2 kg as a crosslinking promoter and the electron beam exposure was 105 kGy.

The foam sheet had a thickness of 2.9 mm, a gel fraction of 48% and an expansion rate of 13. It also exhibited good surface morphology, excellent appearance and shape maintenance. Cells in the foam sheet were uniform.

Example 9

A foam sheet was prepared in the same manner as in Example 1 except that 1,6-hexane diol dimethacrylate was used in an amount of 5 kg as a crosslinking promoter.

The foam sheet had a thickness of 3.4 mm, a gel fraction of 60% and an expansion rate of 13. It also exhibited good surface morphology, excellent appearance and shape maintenance. Cells in the foam sheet were uniform.

Example 10

A foam sheet was prepared in the same manner as in Example 1 except that azodicarbonamide was used in an amount of 15 kg as a blowing agent.

The foam sheet had a thickness of 4.1 mm, a gel fraction of 45% and an expansion rate of 28. It also exhibited good surface morphology, excellent appearance and shape maintenance. Cells in the foam sheet were uniform.

Example 11

A foam sheet was prepared in the same manner as in Example 1 except that divinyl benzene was used as a crosslinking promoter.

The foam sheet had a thickness of 3.7 mm, a gel fraction of 55% and an expansion rate of 18. It also exhibited good surface morphology, excellent appearance and shape maintenance. Cells in the foam sheet were uniform.

Comparative Example 3

A foam sheet was prepared in the same manner as in Example 1 except that a crosslinking promoter was not employed. However, when introduced into a vertical hot air foaming oven, the sheet broke down so that a foaming sheet could not be obtained.

Comparative Example 4

Since the temperature of the foaming oven in Comparative Example 3 was thought to be too high, the temperature of the foaming oven in this Comparative Example was set to 200° C. When introduced into the oven, however, the sheet broke down so that a foaming sheet could not be obtained.

Comparative Example 5

Since the temperature of the foaming oven in Comparative Example 4 was thought to be too high, the temperature of the foaming oven was set to 170° C. 0.7 kg of zinc oxide was also added. When introduced into the oven, however, the sheet broke down so that a foaming sheet could not be obtained.

Comparative Example 6

Since the exposure in Comparative Example 3 was thought to be too low, the exposure of the electron beam was changed to 160 kGy, resulting in unevenness of the sheet surface. When the sheet was continuously introduced into a vertical foaming oven, it also broke down so that a foaming sheet could not be obtained.

Even though the temperature of the foaming oven was lowered in order to obtain the melt viscosity required to maintain decomposed gas of a blowing agent in Comparative Examples 3-6, the melt viscosity was insufficient so that a foaming sheet could not be obtained by irradiation with electron beam. Therefore, as seen in Examples 1-5 and 8-11, it is apparent that the use of a crosslinking promoter provides significant effects.

Example 12

100 kg of polybutylene succinate (PBS) (manufactured by Showa High Polymer Co., Ltd., Product name: Bionoie #1003) as a biodegradable resin, 7.0 kg of azodicarbonamide as a blowing agent, 3.0 kg of 1,6-hexane diol dimethacrylate as a crosslinking promoter, 0.6 kg of dicumyl peroxide as an organic peroxide, 0.3 kg of each of Irganox 245 (manufactured by Ciba Specialty Chemicals) and AO-412S (manufactured by Asahi Electrochemical Co., Ltd.) as a stabilizer were introduced into a twin screw extruder equipped with a vent and heated to a temperature incapable of decomposing the blowing agent (i.e., 160° C. ). It was then extruded from a T-die to produce a sheet with a thickness of 1.5 mm for crosslinking and foaming. This sheet was continuously introduced into a vertical hot air foaming device, of which the front portion temperature and the rear portion temperature were set to 200° C. and 230° C., respectively. The sheet was subjected to heating and foaming to subsequently wind the crosslinked foam in a continuous sheet form.

The foam sheet had a thickness of 2.7 mm, a gel fraction of 19% and an expansion rate of 9. Although the foam sheet looked somewhat yellow, it exhibited excellent shape maintenance. Cells in the foam sheet were uniform.

Example 13

A foam sheet was prepared in the same manner as in Example 12 except that 0.7 kg of zinc oxide was further added as a catalyst for blowing agent decomposition.

The foam sheet had a thickness of 2.8 mm, a gel fraction of 20% and an expansion rate of 10. The foam sheet looked more white than the one in Example 12, and exhibited excellent shape maintenance. Cells in the foam sheet were uniform.

Example 14

A foam sheet was prepared in the same manner as in Example 12 except that 0.8 kg of 2,5-dimethyl-2,5-bis(t-butylperoxy)-3-hexyne as an organic peroxide and 7 kg of 1,6-hexane diol dimethacrylate as a crosslinking promoter were used.

The foam sheet had a thickness of 3.2 mm, a gel fraction of 30% and an expansion rate of 14. Although the foam sheet looked somewhat yellow, it exhibited excellent shape maintenance. Cells in the foam sheet were uniform.

Comparative Example 7

A foam sheet was prepared in the same manner as in Example 12 except that a crosslinking promoter was not used. When introduced into a foaming oven set to 200° C., however, the sheet broke down so that a foam sheet could not be obtained.

Comparative Example 8

A foam sheet was prepared in the same manner as in Example 13 except that a crosslinking promoter was not used. When introduced into a foaming oven set to 200° C., the sheet broke down so that a foam sheet could not be obtained.

Comparative Example 9

A foam sheet was prepared in the same manner as in Example 14 except that a crosslinking promoter was not used. When introduced into a foaming oven set to 200° C., the sheet broke down so that a foam sheet could not be obtained.

As seen in Examples 12 to 14 and Comparative Examples 7 to 9, it is apparent that the required melt viscosity for foaming can be obtained only when an organic peroxide and a crosslinking promoter are used together. Thus, the use of a crosslinking promoter provides significant effects.

Comparative Example 10

Polybutylene succinate (PBS) (manufactured by Showa High Polymer Co., Ltd., Product name: Bionole #1903) as a biodegradable resin was introduced into an extruder set to 150° C. with the addition of about 5.0 wt % of carbon dioxide gas from the middle of the extruder. It was then extruded from a circular die having a lip width of 0.4 mm to obtain a sheet foamed by the pressure release.

The foam sheet had a thickness of 1.9 mm, a gel fraction of 0% and an expansion rate of 16. It exhibited excellent appearance. However, cells in the foam sheet were non-uniform and the sheet was twisted in the direction of the thickness.

Results of the Examples and Comparative Examples are summarized in Tables 1 and 2 provided below. The abbreviations in Tables 1 and 2 are defined as follows:

| The kind of a crosslinking promoter | HX: 1,6-hexane diol dimethacrylate<br>DVB: divinyl benzene |
| The kind of a crosslinking agent | DCP: dicumyl peroxide<br>DBH: 2,5-dimethyl-2,5-bis(t-butylperoxy)-3-hexyne |

INDUSTRIAL APPLICABILITY

The present invention relates to a crosslinked biodegradable resin continuous foam sheet and a method for production thereof. The foam sheet of the present invention can be biodegraded and recycled, while possessing good molding processability and practically satisfactory thermal resistance. Furthermore, the foam sheet is lightweight and exhibits excellent appearance. Thus, the foam sheet of the present invention can be used in a wide range of applications such as, for example, interior materials for an automobile, thermal insulators such as a pipe covering and cushioning materials such as a tape core.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

TABLE 1

| | | | | | Process conditions | | | | | | |
|---|---|---|---|---|---|---|---|---|---|---|---|
| | | | | Blowing | Crosslinking promoter | | Foaming | | Catalyst for blowing agent | Crosslinking agent | |
| | | | Resin | agent (part) | Kind | Amount (part) | Exposure (kGy) | Temperature (° C.) | decomposition (part) | Kind | Amount (part) |
| Biodegradability of Resin | Example | 1 | PBS | 7 | HX | 3 | 55 | 230 | — | — | — |
| | | 2 | PBS/A | 7 | HX | 3 | 55 | 230 | — | — | — |
| | | 3 | PBT/A | 7 | HX | 3 | 80 | 230 | — | — | — |
| | | 4 | PCL | 7 | HX | 3 | 55 | 230 | — | — | — |
| | | 5 | PLA | 7 | HX | 7 | 80 | 240 | — | — | — |
| | Comp. Ex. | 1 | PP/PE | 7 | HX | 5 | 55 | 240 | — | — | — |
| Recyclability | Example | 6 | Recycling Example 1 | 7 | HX | 3 | 80 | 230 | — | — | — |
| | | 7 | Recycling Example 2 | 7 | HX | 3 | 80 | 230 | — | — | — |
| | Comp. Ex. | 2 | Recycling Comp. Ex. 1 | 7 | HX | 3 | — | — | — | — | — |
| Electron beam irradiation + Crosslinking promoter, Blowing agent | Example | 8 | PBS | 7 | HX | 2 | 105 | 230 | — | — | — |
| | | 9 | PBS | 7 | HX | 5 | 65 | 230 | — | — | — |
| | | 10 | PBS | 15 | HX | 3 | 60 | 230 | — | — | — |
| | | 11 | PBS | 7 | DVB | 3 | 80 | 230 | — | — | — |
| | Comp. Ex. | 3 | PBS | 7 | — | — | 80 | 230 | — | — | — |
| | | 4 | PBS | 7 | — | — | 80 | 200 | — | — | — |

TABLE 1-continued

| | | | | Blowing agent (part) | Crosslinking promoter Kind | Crosslinking promoter Amount (part) | Foaming Exposure (kGy) | Temperature (° C.) | Catalyst for blowing agent decomposition (part) | Crosslinking agent Kind | Crosslinking agent Amount (part) |
|---|---|---|---|---|---|---|---|---|---|---|---|
| | | | Resin | | | | | | | | |
| | | 5 | PBS | 7 | — | — | 80 | 170 | 0.7 | — | — |
| | | 6 | PBS | 7 | — | — | 160 | 230 | — | — | — |
| Chemical crosslinking + crosslinking agent | Example | 12 | PBS | 7 | HX | 3 | 0 | 230 | 0 | DCP | 0.6 |
| | | 13 | PBS | 7 | HX | 3 | 0 | 230 | 0.7 | DCP | 0.6 |
| | | 14 | PBS | 7 | HX | 3 | 0 | 230 | 0 | DBH | 0.8 |
| | Comp. Ex. | 7 | PBS | 7 | — | — | 0 | 230 | 0 | DCP | 0.6 |
| | | 8 | PBS | 7 | — | — | 0 | 230 | 0.7 | DCP | 0.6 |
| | | 9 | PBS | 7 | — | — | 0 | 230 | 0 | DBH | 0.8 |
| Non-crosslinking extrusion foaming | Comp. Ex. | 10 | PBS | $CO_2$ 5 parts | | 0 | 0 | 0 | 0 | 0 | 0 |

TABLE 2

The properties of the foam sheet

| | | | Thickness (mm) | Expansion rate | Gel fraction (%) | Biodegradability | Surface Appearance | Foaming | Yellowing index | Thermal resistance | Recyclability | Thermoforming ratio | Low pressure molding processability |
|---|---|---|---|---|---|---|---|---|---|---|---|---|---|
| Biodegradability of Resin | Example | 1 | 4 | 16 | 38 | ◎ | ◎ | ◎ | ◎ | ○ | ◎ | ◎ | — |
| | | 2 | 3.7 | 20 | 40 | ◎ | ◎ | ◎ | ◎ | ○ | ◎ | ◎ | — |
| | | 3 | 2.8 | 15 | 22 | ◎ | ◎ | ◎ | ◎ | ◎ | ◎ | ◎ | — |
| | | 4 | 3.8 | 20 | 42 | ◎ | ◎ | ◎ | ◎ | ○ | ◎ | ◎ | — |
| | | 5 | 2.8 | 11 | 27 | ○ | ◎ | ◎ | ◎ | ◎ | ○ | ◎ | — |
| | Comp. Ex. | 1 | 3 | 15 | 41 | x | ◎ | ◎ | ◎ | ○ | x | ○ | — |
| Recyclability | Example | 6 | 3.9 | 20 | 49 | ◎ | ◎ | ◎ | ◎ | ○ | ◎ | ◎ | — |
| | | 7 | 3.5 | 18 | 47 | ◎ | ◎ | ◎ | ◎ | ○ | ◎ | ◎ | — |
| | Comp. Ex. | 2 | Incapable of obtaining a foam since it can be formed into a sheet form. | | | | | | | | | | |
| Electron beam irradiation + Crosslinking promoter, Blowing agent | Example | 8 | 2.9 | 13 | 48 | ◎ | ◎ | ◎ | ◎ | ○ | ◎ | ◎ | ◎ |
| | | 9 | 3.4 | 13 | 60 | ○ | ◎ | ◎ | ◎ | ○ | ○ | ○ | ○ |
| | | 10 | 4.1 | 28 | 45 | ◎ | ◎ | ◎ | ◎ | ○ | ◎ | ◎ | — |
| | | 11 | 3.7 | 18 | 40 | ◎ | ◎ | ◎ | ◎ | ○ | ◎ | ◎ | — |
| | Comp. Ex. | 3 | | | | | | No foam | | | | | |
| | | 4 | | | | | | No foam | | | | | |
| | | 5 | | | | | | No foam | | | | | |
| | | 6 | | | | | | No foam | | | | | |
| Chemical crosslinking + crosslinking agent | Example | 12 | 2.7 | 9 | 19 | ◎ | ○ | ○ | ○ | ○ | ◎ | ○ | — |
| | | 13 | 2.8 | 10 | 20 | ◎ | ○ | ○ | ○ | ○ | ◎ | ○ | — |
| | | 14 | 3.2 | 14 | 30 | ◎ | ○ | ○ | ○ | ○ | ◎ | ○ | — |
| | Comp. Ex. | 7 | | | | | | No foam | | | | | |
| | | 8 | | | | | | No foam | | | | | |
| | | 9 | | | | | | No foam | | | | | |
| Non-crosslinking extrusion foaming | Comp. Ex. | 10 | 1.9 | 16 | 0 | ◎ | ◎ | ◎ | ◎ | x | ◎ | x | x |

The invention claimed is:

1. A crosslinked biodegradable resin foamed sheet comprising an irradiated crosslinked polymer comprising a biodegradable resin and a crosslinking promoter selected from the group consisting of methacrylates and acrylates, wherein the biodegradable resin is at least one selected from the group consisting of polylactic acid, biodegradable aliphatic polyesters prepared by polycondensation, biodegradable aromatic copolyesters prepared by polycondensation, lactone resins, biodegradable cellulose esters, polypeptides, polyvinyl alcohol, starch, cellulose, chitinchitosans and natural linear polyester resins; and wherein the foamed sheet has an expansion rate of 1.5 to 50 and a gel fraction of at least 3%.

2. The foamed sheet of claim 1, wherein the expansion rate is from 5 to 40.

3. The foamed sheet of claim 1, wherein the gel fraction is from 15 to 70%.

4. The foamed sheet of claim 1, wherein the biodegradable resin is at least one selected from the group consisting of polylactic acid, biodegradable aliphatic polyesters prepared by polycondensation, biodegradable aromatic copolyesters prepared by polycondensation and lactone resins.

5. The foamed sheet of claim 1, wherein at least four thermoforming ratios measured at 100, 120, 140, 160, 180 and 200° C. are 0.50 to 2.00.

6. The foamed sheet of claim 1, wherein a thermoforming ratio in a temperature range of 100 to 200° C. is 0.50 to 2.00.

7. The foamed sheet of claim 1 comprising a first surface laminated with a skin material.

8. The foamed sheet of claim 7 comprising a second surface disposed opposite to the first surface, the second surface being integrated with a substrate comprising thermoplastic resin.

9. The foamed sheet of claim 8 wherein the gel fraction is at least 50%.

10. A method for production of a crosslinked biodegradable resin continuous foamed sheet, comprising:

a) preparing a sheet from a resin composition comprising a biodegradable resin, a thermal decomposable blowing agent and a crosslinking promoter;

b) irradiating the sheet with an ionizing radiation to crosslink the resin composition and promoting crosslinking of the biodegradable resin by the crosslinking promoter under ionizing irradiation; and c) subjecting the crosslinked sheet to heat treatment to continuously prepare a crosslinked foamed sheet comprising an irradiated crosslinked polymer comprising the biodegradable resin and the crosslinking promoter selected from the group consisting of methacrylates and acrylates.

11. The method of claim 10, wherein the crosslinking promoter in the resin composition ranges from 0.5 to 10 parts by weight based on 100 parts by weight of the biodegradable resin.

12. The method of claim 10, wherein the thermal decomposable blowing agent in the resin composition ranges from 1 to 50 parts by weight based on 100 parts by weight of the biodegradable resin.

13. The method of claim 10, wherein the ionized radiation is an electron beam.

14. The method of claim 10, wherein the biodegradable resin is at least one selected from the group consisting of polylactic acid, biodegradable aliphatic polyesters prepared by polycondensation, biodegradable aromatic copolyesters prepared by polycondensation, lactone resins, biodegradable cellulose esters, polypeptides, polyvinyl alcohol, starch, cellulose, chitin, chitosan and natural linear polyester resins.

15. The method of claim 14, wherein the biodegradable resin is at least one selected from the group consisting of polylactic acid, biodegradable aliphatic polyesters prepared by polycondensation, biodegradable aromatic copolyesters prepared by polycondensation and lactone resins.

* * * * *